(12) United States Patent
de la Iglesia et al.

(10) Patent No.: US 8,442,059 B1
(45) Date of Patent: May 14, 2013

(54) STORAGE PROXY WITH VIRTUAL PORTS CONFIGURATION

(75) Inventors: Erik de la Iglesia, Sunnyvale, CA (US); Surya Nambala, Sunnyvale, CA (US)

(73) Assignee: GridIron Systems, Inc., Sunnyvale, CA (US)

( * ) Notice: Subject to any disclaimer, the term of this patent is extended or adjusted under 35 U.S.C. 154(b) by 170 days.

(21) Appl. No.: 12/855,651

(22) Filed: Aug. 12, 2010

Related U.S. Application Data

(63) Continuation-in-part of application No. 12/568,612, filed on Sep. 28, 2009, now Pat. No. 8,160,070.

(60) Provisional application No. 61/101,645, filed on Sep. 30, 2008.

(51) Int. Cl.
*H04L 12/56* (2006.01)

(52) U.S. Cl.
USPC .......................... 370/400; 370/389; 370/392

(58) Field of Classification Search .................. 370/389, 370/392, 400
See application file for complete search history.

(56) References Cited

U.S. PATENT DOCUMENTS

| | | | |
|---|---|---|---|
| 6,401,147 B1 | 6/2002 | Sang et al. | |
| 6,678,795 B1 | 1/2004 | Moreno et al. | |
| 6,721,870 B1 | 4/2004 | Yochai et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 2002/0035655 A1 | 3/2002 | Finn et al. | |
| 2003/0012204 A1* | 1/2003 | Czeiger et al. | 370/401 |
| 2003/0167327 A1 | 9/2003 | Baldwin et al. | |
| 2003/0177168 A1 | 9/2003 | Heitman et al. | |
| 2003/0210248 A1 | 11/2003 | Wyatt | |
| 2004/0215923 A1 | 10/2004 | Royer | |
| 2005/0025075 A1* | 2/2005 | Dutt et al. | 370/299 |
| 2005/0195736 A1* | 9/2005 | Matsuda | 370/216 |
| 2006/0005074 A1 | 1/2006 | Yanai et al. | |
| 2006/0034302 A1* | 2/2006 | Peterson | 370/401 |
| 2006/0053263 A1 | 3/2006 | Prahlad et al. | |
| 2006/0075191 A1 | 4/2006 | Lolayekar et al. | |

(Continued)

OTHER PUBLICATIONS

Stolowitz Ford Cowger Listing of Related Cases, Feb. 7, 2012.

(Continued)

*Primary Examiner* — Dang Ton
*Assistant Examiner* — Mewale Ambaye
(74) *Attorney, Agent, or Firm* — Stolowitz Ford Cowger LLP

(57) ABSTRACT

A fiber channel network is configured into different zones. A first zone of the fiber channel network is configured with an initiator port, a first virtual port for a first physical port on a storage proxy, and a first virtual port for a second physical port on the storage proxy. A second zone of the fiber channel network is configured with a storage target port, a second virtual port for the first physical port on a storage proxy, and a second virtual port for the second physical port on the storage proxy. The virtual ports configured on the storage proxy increase the amount of bandwidth in the fiber channel available for asymmetric data transfers.

18 Claims, 7 Drawing Sheets

U.S. PATENT DOCUMENTS

| | | | |
|---|---|---|---|
| 2006/0112232 | A1 | 5/2006 | Zohar et al. |
| 2006/0212524 | A1 | 9/2006 | Wu et al. |
| 2006/0218389 | A1 | 9/2006 | Li et al. |
| 2006/0277329 | A1 | 12/2006 | Paulson et al. |
| 2007/0050548 | A1 | 3/2007 | Bali et al. |
| 2007/0079105 | A1 | 4/2007 | Thompson |
| 2007/0118710 | A1 | 5/2007 | Yamakawa et al. |
| 2007/0192444 | A1 | 8/2007 | Ackaouy et al. |
| 2007/0283086 | A1 | 12/2007 | Bates |
| 2008/0028162 | A1 | 1/2008 | Thompson |
| 2008/0098173 | A1 | 4/2008 | Chidambaran et al. |
| 2008/0104363 | A1 | 5/2008 | Raj et al. |
| 2008/0162864 | A1 | 7/2008 | Sugumar et al. |
| 2008/0215834 | A1 | 9/2008 | Dumitru et al. |
| 2008/0250195 | A1 | 10/2008 | Chow et al. |
| 2008/0320269 | A1 | 12/2008 | Houlihan et al. |
| 2009/0006725 | A1 | 1/2009 | Ito et al. |
| 2009/0006745 | A1 | 1/2009 | Cavallo et al. |
| 2009/0034377 | A1 | 2/2009 | English et al. |
| 2009/0110000 | A1* | 4/2009 | Brorup .......................... 370/468 |
| 2009/0240873 | A1 | 9/2009 | Yu et al. |
| 2009/0259800 | A1 | 10/2009 | Kilzer et al. |
| 2009/0262741 | A1 | 10/2009 | Jungck et al. |
| 2009/0276588 | A1 | 11/2009 | Murase |
| 2009/0307388 | A1 | 12/2009 | Tchapda |
| 2010/0011154 | A1 | 1/2010 | Yeh |
| 2010/0030809 | A1 | 2/2010 | Nath |
| 2010/0080237 | A1 | 4/2010 | Dai et al. |
| 2010/0088469 | A1 | 4/2010 | Motonaga et al. |
| 2010/0115206 | A1 | 5/2010 | de la Iglesia et al. |
| 2010/0115211 | A1 | 5/2010 | de la Iglesia et al. |
| 2010/0122020 | A1 | 5/2010 | Sikdar et al. |
| 2010/0125857 | A1 | 5/2010 | Dommeti et al. |
| 2010/0169544 | A1 | 7/2010 | Eom et al. |
| 2010/0174939 | A1 | 7/2010 | Vexler |
| 2011/0047347 | A1 | 2/2011 | Li et al. |
| 2011/0258362 | A1 | 10/2011 | McLaren et al. |
| 2012/0198176 | A1 | 8/2012 | Hooker et al. |

OTHER PUBLICATIONS

Rosenblum, Mendel and Ousterhout, John K., The LFS Storage Manager, Proceedings of the 1990 Summer Usenix. 1990 pp. 315-324.

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

\* cited by examiner

STORAGE PROXY WITH VIRTUAL PORTS CONFIGURATION

The present application is a continuation-in-part of U.S. patent application Ser. No. 12/568,612 filed Sep. 28, 2009, which claims priority to U.S. Provisional Application Ser. No. 61/101,645 filed Sep. 30, 2008, which are both incorporated by reference in their entirety.

BACKGROUND

Fibre Channel (FC) provides practical, inexpensive, expandable means of transferring data between workstations, mainframes, supercomputers, desktop computers, storage devices, displays and other peripherals at fast data rates. Fibre channel is especially suited for connecting computer servers to shared storage devices and for interconnecting storage controllers and drives.

Fibre channel provides an active intelligent interconnection scheme, called a fabric, to connect devices. Fibre channel ports only have to manage a simple point-to-point connection between itself and another fibre channel device. Fibre Channel Protocol (FCP) predominantly transports Small Computer System Interface (SCSI) commands over Fibre Channel networks.

A proxy is a device that acts as an intermediary among two or more devices. Proxies can be used for improving performance, load balancing, management, or adding new functionality. A fibre channel network can be used for connecting the proxy to different processing elements. However, the fibre channel network should provide sufficient bandwidth in order for the proxy to operate efficiently.

DETAILED DESCRIPTION OF THE DRAWINGS

Several preferred examples of the present application will now be described with reference to the accompanying drawings. Various other examples are also possible and practical. This application may be exemplified in many different forms and should not be construed as being limited to the examples set forth herein.

Figure 1:
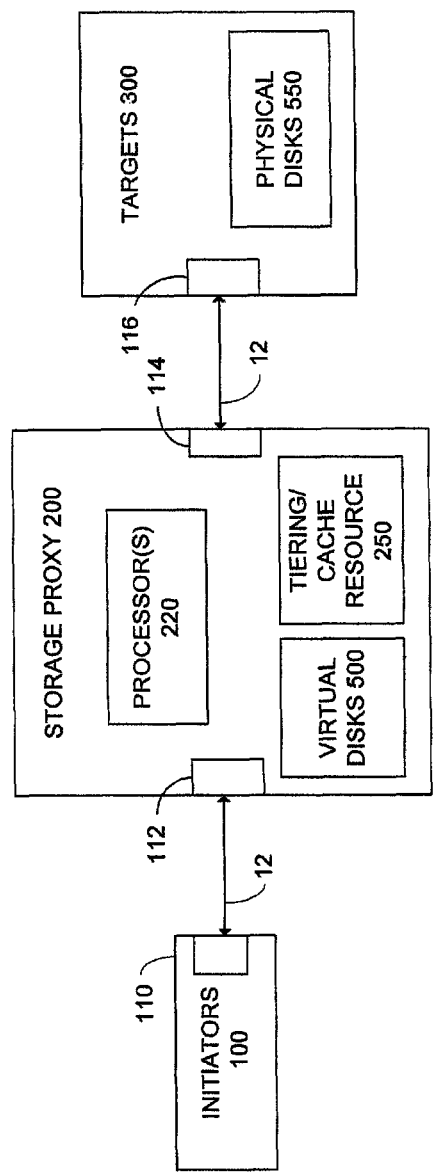
FIG. 1 is a block diagram showing a storage proxy coupled between initiators and targets.

FIG. 1 shows a storage proxy 200 connected between initiators 100 and targets 300. The initiators 100 can be any device or software application that writes and reads data to and from another device. The targets 300 can be any device that stores data that is accessed by another device, application, software, initiator, etc.

In some embodiments, the targets 300 are storage devices or storage servers that contain storage media such as solid state memory and/or storage disks. In one embodiment, the targets 300 may also contain multiple storage disks that are referred to generally as a disk array. Unless otherwise explained, whenever an initiator, target, or storage proxy is described below, it may refer either to a single or multiple initiators, targets, or storage proxies, respectively.

In some embodiments, the initiators 100 are servers, server applications, routers, switches, client computers, personal computers, Personal Digital Assistants (PDA), or any other wired or wireless computing device that needs to access the data in targets 300. In one embodiment, the initiators 100 may be stand-alone appliances, devices, or blades, and the targets 300 are stand-alone storage arrays.

Targets 300 may be thought of as any entity that receives and satisfies storage operations such as reads and writes to storage media. The disks or devices serving as the physical storage media may be local, remote or abstracted through another target in such a manner that initiators 100 need only have knowledge of targets 300 to access the storage. Likewise, initiators 100 may be thought of as any entity that issues storage operations. The applications or servers actually using the storage data may be abstracted or proxied (such as under an operation system or virtualized environment respectively) in such a manner that targets 300 only have knowledge of initiators 100.

In some embodiments, the initiators 100, storage proxy 200, and targets 300 are each coupled to each other via wired or wireless Internet connections 12. In other embodiments, the initiators 100 may be a processor or applications in a personal computer or server that accesses one or more targets 300 over an internal or external data bus. The targets 300 in this embodiment could be located in the personal computer or server 100, or could also be a stand-alone device coupled to the computer/initiators 100 via a computer bus or packet switched network connection.

The storage proxy 200 could be hardware and/or software located in a storage appliance, wireless or wired router, gateway, firewall, switch, or any other computer processing system. The storage proxy 200 provides an abstraction of physical disks 550 in targets 300 as virtual disks 400. In one embodiment, the physical disks 550 and the virtual disks 400 may be identical in size and configuration. In other embodiments the virtual disks 400 could consist of stripes of data or volumes of data that extend across multiple different physical disks 550.

The initiators 100 and targets 300 can be directly connected, or connected to each other through a network or fabric 12. The network, bus, connections, fabric or any other communication connectivity 12 between the initiators 100, storage proxy 200, and targets 300 will be referred to generally below as a storage fabric.

Different communication protocols can be used over storage fabric 12 between initiators 100 and targets 300. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE) and others.

In some embodiments, the initiators 100, storage proxy 200, and targets 300 operate fibre channel interface cards or Host Bus Adapters (HBA) that include ports 110-116, respectively. The fibre channel HBAs allow the initiators 100, storage proxy 200, and targets 300 to communicate over a fibre channel medium 12 using the fibre channel protocol. Each physical port on each HBA has a unique World Wide Name (WWN) and World Wide Identifier (WWID) for the storage behind it, the prior being similar to an Ethernet Media Access Control (MAC) address. The combination of WWN and WWID are unique identifiers which identify a particular fibre channel, Advanced Technology Attachment (ATA) or Serial Attached SCSI (SAS) target.

The initiators 100 conduct different storage operations with the physical disks 550 in targets 300 though the storage proxy 200. The storage operations may include write operations and read operations that have associated storage addresses. These interactions with storage proxy 200 and other components of storage proxy 200 may be normalized to block-level operations such as "reads" and "writes" of an arbitrary number of blocks. The storage proxy 200 contains one or more processors 220 and a tiering and/or cache resource 250 that contains different combinations of Flash memory and Dynamic Random Access Memory (DRAM) that may have faster access speeds than the disks 550 in targets 300.

The processor 220 receives read and write operations from the initiators 100 directed to particular storage volumes for disk storage arrays in targets 300. If data for a read request is currently stored in the tiering or cache resource 250, the storage proxy 200 provides the data back to the initiators 100. If the tiering or cache resource 250 does not contain the requested data, the storage proxy 200 forwards the read request to the targets 300. The data obtained from targets 300 is then forwarded back through the storage proxy 200 to the initiators 100.

Figure 2:
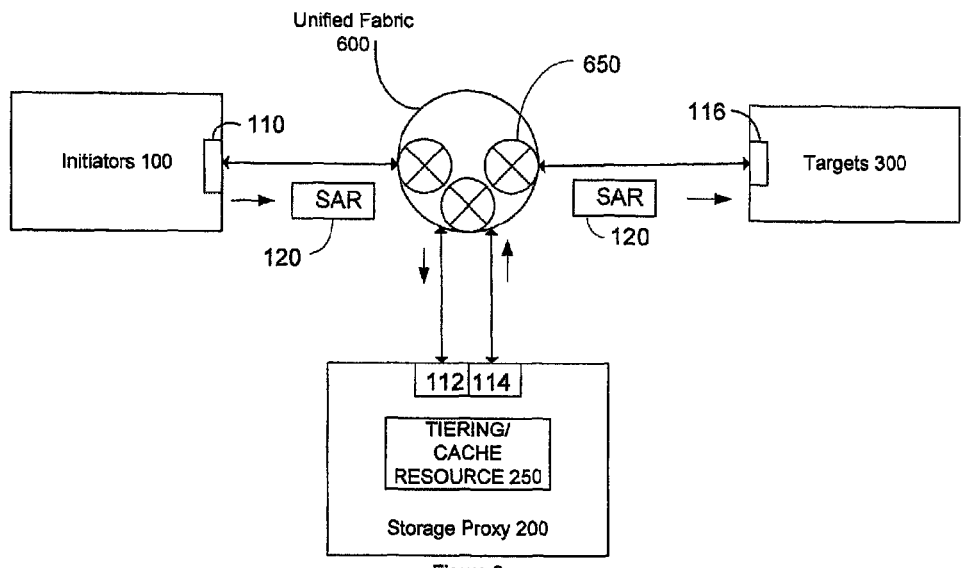
FIG. 2 shows a unified fabric connecting the storage proxy to the initiators and targets.

FIG. 2 shows a unified storage fabric 600 configuration for connecting the storage proxy 200 to the initiators 100 and targets 300. In one embodiment, the storage fabric 600 is a fibre channel fabric made up of a number of fibre channel switches 650. Fibre channel fabrics and the switches 650 used within the fibre channel 600 are known and are therefore not described in further detail.

In this example, one or more interface cards in initiators 100 include one or more physical ports 110 that are connected to the storage fabric 600. One or more interface cards in targets 300 include one or more physical ports 116 connected to the storage fabric 600. The storage proxy 200 includes one or more interface cards that include multiple physical ports 112 and 114. The two physical ports 112 and 114 may reside in a same network interface card or HBA card, or may each be on different interface card.

In the unified storage fabric configuration in FIG. 2, storage access requests 120 are sent from the initiators 100 to the targets 300. The storage access requests 120 are either for reading or writing data. The requests 120 are redirected through the storage fabric 600 to physical port 112 in the storage proxy 200. As mentioned above, the tiering media or cache resource 250 in the storage proxy 200 may contain the data associated with the request 120. If so, the storage proxy 200 sends the data from the tiering or cache resource 250 back to the initiators 100 over physical port 112.

As also mentioned above, the data associated with the storage access request 120 may not be contained in tiering or cache resource 250. The storage proxy 200 would then forward the storage access request 120 on to the targets 300 over physical port 114. The targets 300 return the data back to the storage proxy 200 over physical port 114 and the storage proxy 200 then forwards the data to the initiator 100 over physical port 112. Note that when the resource 250 in storage proxy 200 contains the requested data, no data needs to be transferred over physical port 114 from the targets 300. Thus, at times the bandwidth needed over physical port 112 may be different than the bandwidth needed over physical port 114. In other words, the bandwidth used by storage proxy 200 over physical ports 112 and 114 at times may be asymmetric. Due to configuration requirements of unified fabric 600 that will be explained subsequently, proxy physical port 112 is unable to communicate with target physical port 116 and proxy physical port 114 is unable to communicate with initiator physical port 110.

Figure 3:
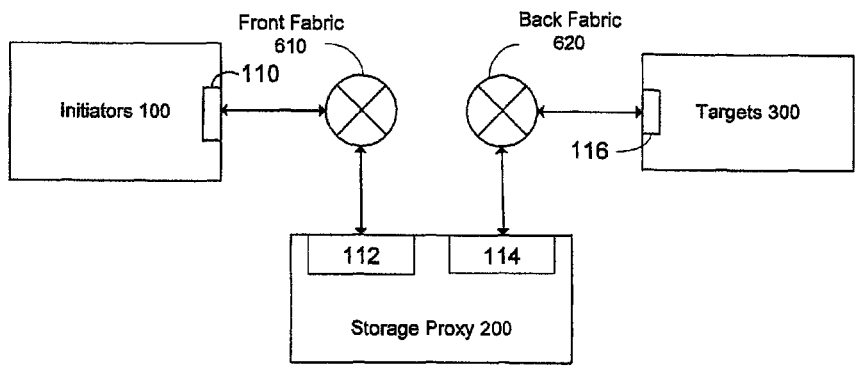
FIG. 3 shows a separated fabric coupling the storage proxy to the initiators and targets.

FIG. 3 shows a different configuration for connecting the storage proxy 200 to the initiators 100 and targets 300. In this configuration, a first front fabric 610 is used for connecting the initiators 100 to the storage proxy 200 and a second separate back fabric 620 is used for connecting the storage proxy 200 to the targets 300. In this configuration the physical port 110 in the initiator 100 is coupled through the front fabric 610 to the physical port 112 on storage proxy 200 and the physical port 116 in the targets 300 is coupled through the back fabric 620 to the physical port 114 on storage proxy 200. The data traffic over front fabric 610 is physically separated from the data traffic over back fabric 620. The primary benefit of such a configuration, as compared to the unified fabric of FIG. 2, is that the bandwidth requirements for each fabric are lowered. The unified fabric must forward each storage access request twice as the latter passes from initiators 100 to targets 300. In the split fabrics of FIG. 3, each fabric forwards each request only once (although the total work done by all system components remains the same).

Figure 4:
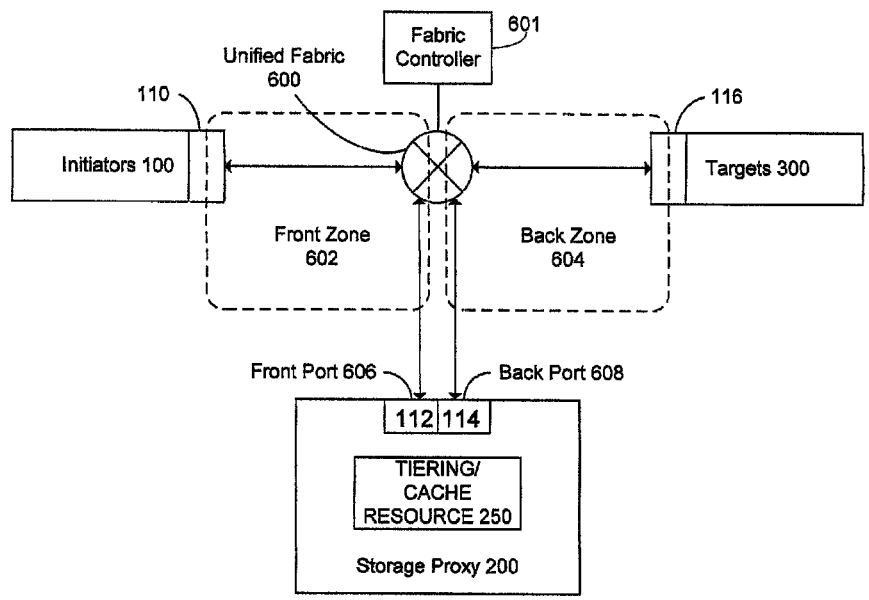
FIG. 4 shows the unified fabric of FIG. 2 in more detail.

FIG. 4 shows the unified storage fabric 600 of FIG. 2 configured into a front zone 602 and a back zone 604. The storage fabric 600 is configured similar to a Virtual LAN (VLAN) where routing is maintained within particular zones and does not overlap between zones. For example, the initiators 100 can only connect to the storage proxy 200 in front zone 602 and cannot connect directly to the targets 300 in back zone 604.

The zoning is enforced by the fibre channel switches 650 shown in FIG. 2 and a fabric controller 601. An administrator defines the front and back zones 602 and 604 that represent different logical groups of devices, or even different logical groups of ports on the devices. The fibre channel switches 650 in fabric 600 then restrict communications between devices and/or ports according to the logical groupings.

In this example, the front zone 602 is configured to include the physical ports 110 in initiators 100 and a physical port 112 in storage proxy 200. The physical port 112 is alternatively referred to as front port 606. The back zone 604 is configured to include the physical port 114 in storage proxy 200 and the physical ports 116 in targets 300. The physical port 114 is alternatively referred to as back port 608.

The fibre channel switches 650 in storage fabric 600 prevent initiators 100 and physical port 112, which are outside the back zone 604, from communicating with the targets 300. Similarly, the fibre channel switches 650 in fabric 600 prevent targets 300 and physical port 114, which are outside the front zone 602, from communicating with the initiators 100. Configuration of the front zone 602 and the back zone 604 in the storage fabric 600 cause the storage access requests from initiators 100 to pass through the storage proxy 200 and cause the data supplied from the targets 300 to also pass through storage proxy 200. Note that any direct communication between initiators 100 and targets 300 that circumvents storage proxy 200 would not be seen by storage proxy 200 and potentially lead to coherency problems. If the data in targets 300 is updated but storage proxy 200 maintains older tiered data, serving this older data to initiators 100, in response to a future read operation, would cause storage corruption. For this reason, the zoning requirements are required for correct operation of storage proxy 200.

Configuring a fibre channel network into different zones is described in more detail in U.S. patent application Ser. No. 12/568,612 filed Sep. 28, 2009 and U.S. Provisional Application Ser. No. 61/101,645 filed Sep. 30, 2008, which are both herein incorporated by reference in their entirety.

Asymmetrically Increasing Bandwidth

In certain storage fabric applications, data or information is first sent from initiators 100 to an intermediary. Data or information is then forwarded from the intermediary to the targets 300. Any data or information coming back is sent from the targets 300 to the intermediary and then forwarded from the intermediary to the initiators 100. The fabric configuration in FIG. 4 would be appropriate for these symmetric data transfers since the bandwidth used over front zone 602 is substantially the same as the bandwidth used over back zone 604.

When the tiering or cache resource 250 does not contain the requested data, a substantially equal amount of bandwidth might be used over both the front zone 602 and back zone 604. A storage access request 120 (FIG. 2) is sent from the initiators 100 over front zone 602 to storage proxy 200 and then forwarded by the storage proxy 200 to targets 300 over back zone 604. The date from targets 300 is sent back to the storage proxy 200 over back zone 604 and the data is then forwarded by the storage proxy 200 to the initiators 100 over front zone 602. The bandwidth usage is substantially symmetric since the same amount of data needs to be transferred over the front zone 602 and back zone 604.

However, the bandwidth used over front zone 602 at times may be different from the bandwidth used over back zone 604. As mentioned above, when the tiering or cache resource 250 contains the data for the storage access request 120, more bandwidth may be needed in the front zone 602. In another situation, the storage proxy 200 may request data from the targets 300 pursuant to say a tiering or prefetch operation. In this situation more bandwidth may be needed in back zone 604.

There may be times when not enough bandwidth is available in the front zone 602 or back zone 604 and the bandwidth available in the other zone is underutilized. This is alternatively referred to as asymmetric bandwidth usage. Virtual ports are configured into the storage fabric 600 so that underutilized bandwidth in the storage fabric 600 is dynamically redistributed to either the front zone 602 or back zone 604.

Figure 5:
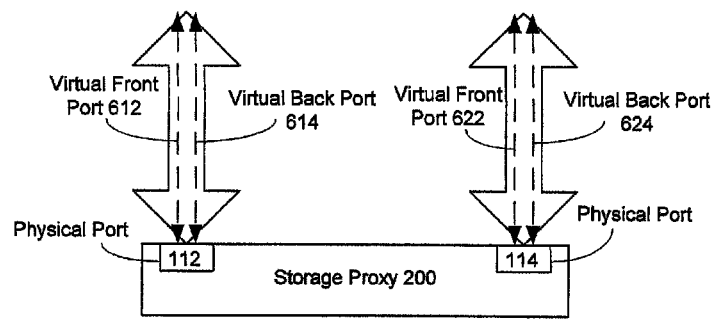
FIG. 5 shows how virtual ports are configured into physical ports.

FIG. 5 shows virtual ports configured in the storage fabric 600 to increase the available bandwidth for different asymmetrical data transfers. In one embodiment, An Nport virtualization is used to assign multiple virtual ports to the same physical port. The N_Port virtualization or NPIV is a fibre channel facility that allows multiple N_Port IDs to share a single physical N_Port. This allows multiple fibre channel initiators to occupy a single physical port. The NPIV is defined by the Technical Committee T11 in the Fibre Channel—Link Services (FC-LS) specification which is herein incorporated by reference in its entirety.

A virtual front port 612 and a virtual back port 614 are configured on the same physical port 112. Similarly, a virtual front port 622 and a virtual back port 624 are configured on the same physical port 114. Again, the physical ports 112 and 114 could be on the same network interface card or Host Bus Adapter (HBA) card or could be located in different network interface cards. Any other physical ports on the network interface cards in the storage proxy 200 could also be configured with front and back virtual ports similar to physical ports 112 and 114.

Figure 6:
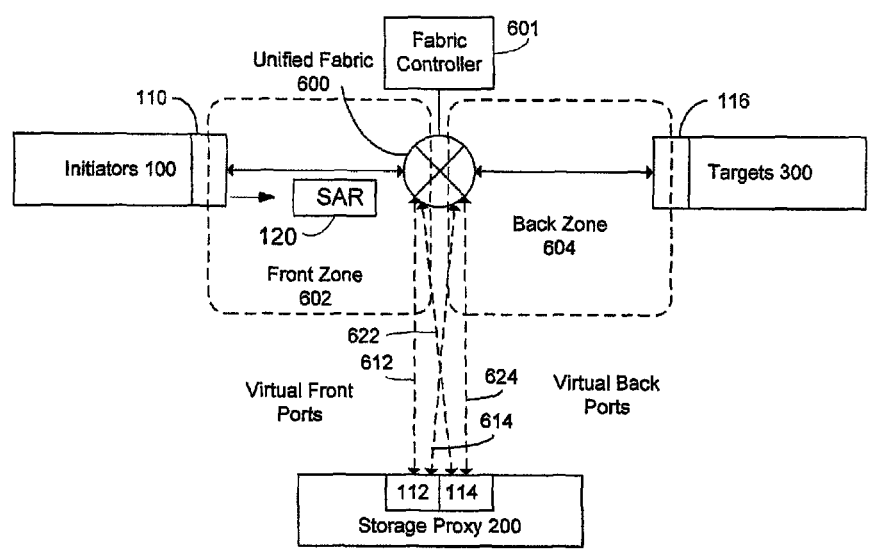
FIG. 6 shows how the virtual ports in FIG. 5 are configured into the unified fabric of FIG. 4.

FIG. 6 shows how the virtual ports in FIG. 5 are configured in more detail. The virtual front port 612 establishes a first logical connection through the front zone 602 of storage fabric 600 between physical port 110 on initiator 110 and physical port 112 on storage proxy 200. The virtual front port 622 establishes a first logical connection through the front zone 602 between physical port 110 on initiator 110 and physical port 114 on storage proxy 200. The virtual back port 614 establishes a logical connection through the back zone 604 of storage fabric 600 between physical port 116 on target 300 and physical port 112 on storage proxy 200. The virtual back port 624 establishes a logical connection through the back zone 604 between physical port 116 on target 300 and physical port 114 on storage proxy 200.

The number of virtual ports may vary according to the number of front and back zones present within unified fabric 600. In one embodiment, initiators 100 may consist of multiple physical ports or multiple virtualized initiators, within distinct front zone, all accessing targets 300 (or subsets of targets 300) through storage proxy 200. In one embodiment, targets 300 may consist of multiple physical ports or multiple virtualized targets, within distinct back zones, all being accessed by initiators 100 (or subsets of initiators 100) through storage proxy 200. The configuration within unified fabric 600 would require that all paths between communicating initiators and targets go through storage proxy 200 with no direct path through unified fabric 600.

Figure 7:
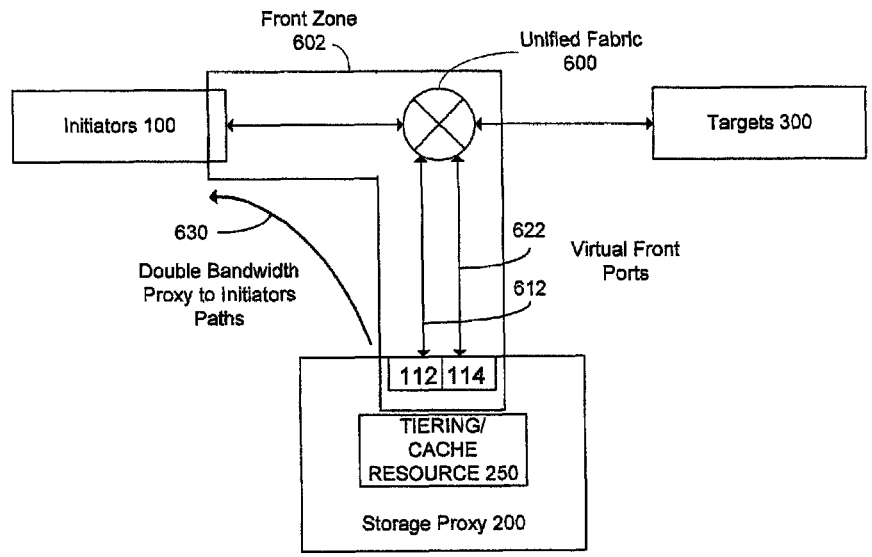
FIG. 7 shows how bandwidth is increased in a front zone of the fabric of FIG. 6.
Figure 8:
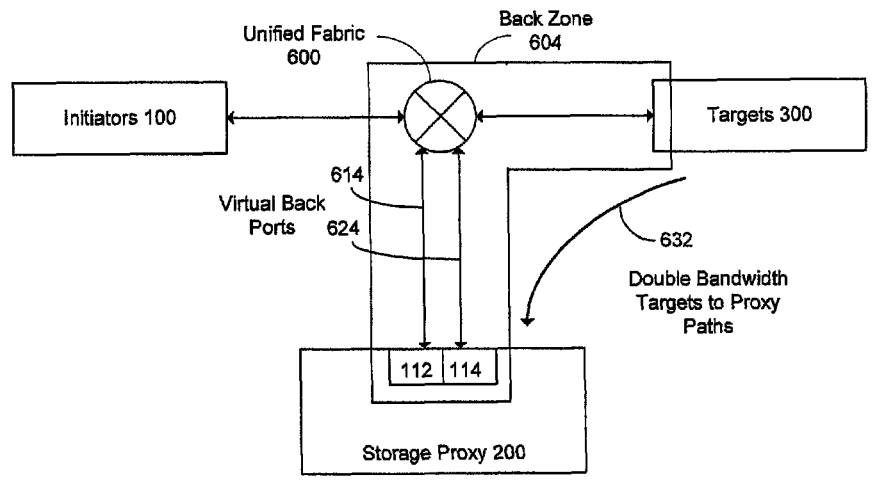
FIG. 8 shows how bandwidth is increased in a back zone of the fabric of FIG. 6.

Referring to FIGS. 7 and 8, the two virtual front ports 612 and 622 or the two virtual back ports 614 and 624 have a combined maximum bandwidth that substantially equals the bandwidth of the two physical ports 112 and 114. Therefore, for certain asymmetric data transfers twice the bandwidth may be available on either the front zone 602 or back zone 604 as compared with the configuration shown in FIG. 4.

FIG. 7 illustrates a situation where the two virtual front ports 612 and 622 configured on physical ports 112 and 114, respectively, provide substantially twice the bandwidth 630 between the initiators 100 and storage proxy 200. This additional bandwidth may be used when the tiering or cache resource 250 contains the data requested in storage access requests from initiators 100.

In this case, the storage proxy 200 receives the read requests from the initiators 100 over the two virtual ports 612 or 622. The tiering or cache resource 250 in storage proxy 200 contains the data responsive to the read request and therefore provides the requested data back to the initiators 100 without having to access the data from targets 300.

The two virtual front ports 612 and 622 are each located on different physical ports 112 and 114 and at any particular time can each use substantially all of the available bandwidth on their respective physical ports. Substantially no bandwidth is currently needed in the back zone 604. Therefore, the amount of bandwidth available in the front zone 602 almost doubles since all of the bandwidth previously only available in the back zone 604 is now made available to the front zone 602 via virtual front port 622. The bandwidth in the back zone 604 is automatically reallocated to the front zone 602 when the switching circuitry 650 in the storage fabric 600 (FIG. 2) starts uses virtual front port 622 on physical port 114 for sending and receiving data and information over the front zone 602.

FIG. 8 illustrates a situation where the two virtual back ports 614 and 624 on physical ports 112 and 114, respectively, substantially double the bandwidth 632 available over back zone 604. The additional bandwidth 632 may be used when data is transferred between the targets 300 and the storage proxy 200. For example, the tiering or cache resource 250 in the storage proxy 200 may not contain the data requested from the initiators 100. The storage proxy 200 forwards the initiator request to the targets 300 and receives the requested data from the targets 300 over virtual back ports 614 and 624.

Additional bandwidth 632 may also be needed in back zone 604 when the storage proxy 200 tiers data or pre-fetches data from the targets 300 in order to populate the tiering or cache resource 250. For example, the storage proxy 200 may determine that particular blocks of data are likely to be read in the near future. The storage proxy 200 may automatically move these blocks of data from the targets 300 to the tiering media 250.

This tiering operation may take place while substantially little activity is happening over front zone 602. At least some of the available bandwidth for the front zone 602 is automatically reallocated to the back zone 604 when the switching circuitry 650 in the storage fabric 600 uses the virtual back ports 614 for the tiering operations. Thus, bandwidth normally only available for front zone 602 is redistributed to back zone 604.

There may be other situations where substantially equal amounts of bandwidth are used in both the front zone 602 and the back zone 604. The switching circuitry 650 in storage fabric 600 automatically starts sending substantially equal amounts of data over both the virtual front ports 612 and 622, and the virtual back ports 614 and 624. Thus, bandwidth is effectively equalized or balanced between the front zone 602 and the back zone 604. The resulting performance capability of storage proxy 200 is one wherein symmetric operation (equal front and back end bandwidths) are large unaffected but wherein asymmetric operation may double the bandwidth as compared to the previous configuration.

Figure 9:
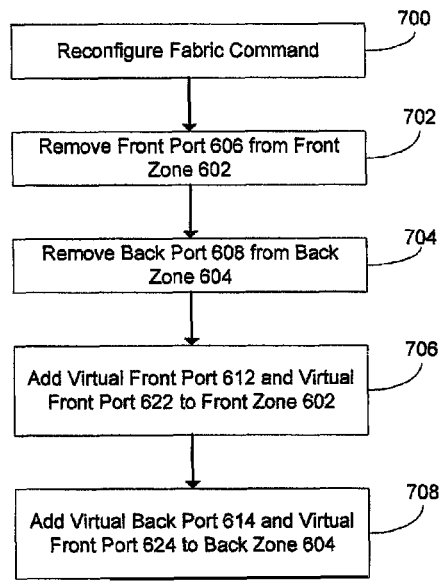
FIG. 9 is a flow diagram showing in more detail how virtual ports are configured into a fabric.

FIG. 9 is a flow diagram explaining one example of how the storage fabric 600 is configured as shown in FIG. 6. In operation 700 one or more fabric reconfigure commands are sent to the switching circuitry 650 or fabric controller 601 in the storage fabric 600 (See FIGS. 2 and 6). For example, an administration computer is connected to the storage fabric 600 that sends the configure commands to the storage fabric controller 601.

Any entity acting as an administrator or with administrative privileges might issue the command, or request some third-party entity to issue the commands. The third-party entity might execute a script which in turn triggers the sequence of events described below. In an alternative embodiment, the configuration command may be sent by the storage proxy 200 to the switching circuitry 650 or controller 601 in the storage fabric 600.

The reconfigure command could also be sent via a Command Line Interface (CLI). If executed from a remote agent, the reconfigure commands could be sent using a remote procedure call such as an XML Remote Procedure Call (xml-rpc), Hypertext Transfer Protocol Post (http post), or some other protocol. The reconfigure command could be sent over a Transmission Control Protocol (TCP) connection which could be carried over an Ethernet network. If executed manually or via an automated agent on a serial console, the reconfigure command could be sent over a serial cable connecting to a console port.

In operation 702, the reconfigure command causes the switching circuitry 650 or fabric controller 601 to remove the front port 606 (FIG. 4) from the front zone 602 in operation 702 and remove the back port 608 from the back zone 604 in operation 704. Removing the front port 606 and back port 608 refer to removing identifiers or addresses associated with the physical ports 112 and 114 from mapping tables used in the storage fabric 600 for establishing different zones and establishing different connections.

The fabric controller 601 in operation 706 adds the virtual front ports 612 and 622 to the front zone 602, and adds the virtual back ports 614 and 624 to the back zone 604 in operation 708. Adding virtual ports refers to adding virtual port identifiers or addresses to the storage fabric mapping tables for the associated zones 602 and 604. The reconfiguration command results in the storage fabric configuration shown above in FIG. 6.

Figure 10:
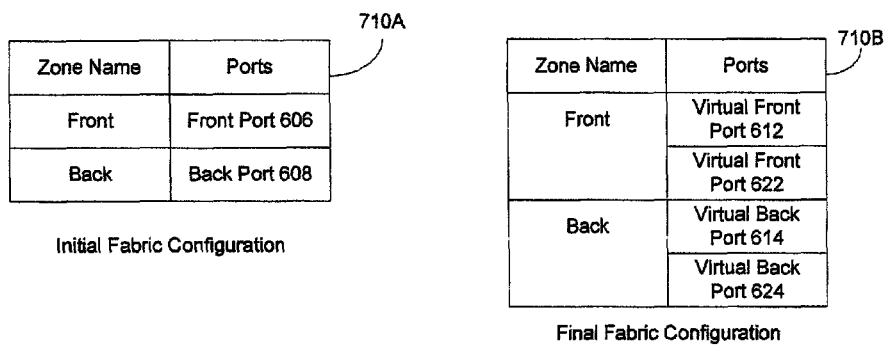
FIG. 10 shows a configuration table used in the fabric.

FIG. 10 shows how a mapping table 710 in the storage fabric 600 is modified by the fabric controller 601 according to the reconfigure command. The mapping table 710 is located in memory within the switching circuitry 650 or fabric controller 601 of the storage fabric 600. The zones 602 and 604 are defined and exist within the storage fabric 600 similar to Virtual Local Area Networks VLANs.

The reconfigure command described in FIG. 9 causes the fabric controller 601 to modify the mapping table 710A into mapping table 710B. The controller 601 maps the two virtual front ports 612 and 622 to the front zone 602 and maps the two virtual back ports 614 and 624 to back zone 604. For example, identifiers or addresses corresponding to the virtual front ports 612 and 622 are mapped with the identifier for front zone 602. The identifiers or addresses for virtual back ports 614 and 624 are mapped with the identifier for back zone 604.

The initiators 100, storage proxy 200, and targets 300 will only see a change in the number of available paths. There were N paths available per zone in table 710A and 2N paths available per zone in table 710B where the paths are to the same elements but with higher aggregate throughput. Discovery state machines operate in a normal fashion in the initiators 100, proxy 200, and targets 300 although now with more paths. The storage proxy 200 maintains a separate configuration indicating weather each physical port is attached to the storage fabric 600 as a single port (front or back end) or two virtual ports (one front one back). This configuration setting exists regardless of the mode of operation within the storage fabric 600.

Figure 11:
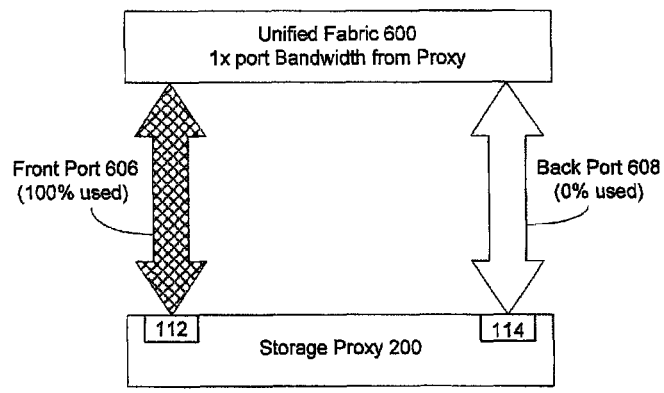
FIGS. 11 and 12 show another example of how the bandwidth is increased in a front zone of the fabric shown in FIG. 6.

FIG. 11 shows how bandwidth is distributed for the single front port and single back port configuration shown in FIG. 4. Assume the current data traffic between the initiators 100 and storage proxy 200 exceeds a maximum bandwidth available over physical port 112. There is only one physical port 112 (referred to as front port 606) configured into the front zone 602 of storage fabric 600. The physical port 114 (referred to as back port 608) is only configured into the back zone 604 of fabric 600.

In the configuration shown in FIG. 4, the ports configured into back zone 604 cannot communicate with the ports configured into front zone 602. In other words, port 114 cannot be used to transfer data over front zone 602. Therefore in FIG. 11, the maximum bandwidth available in the front zone 602 between the initiators 100 and storage proxy 200 is limited to the maximum bandwidth of one single physical port 112.

Figure 12:
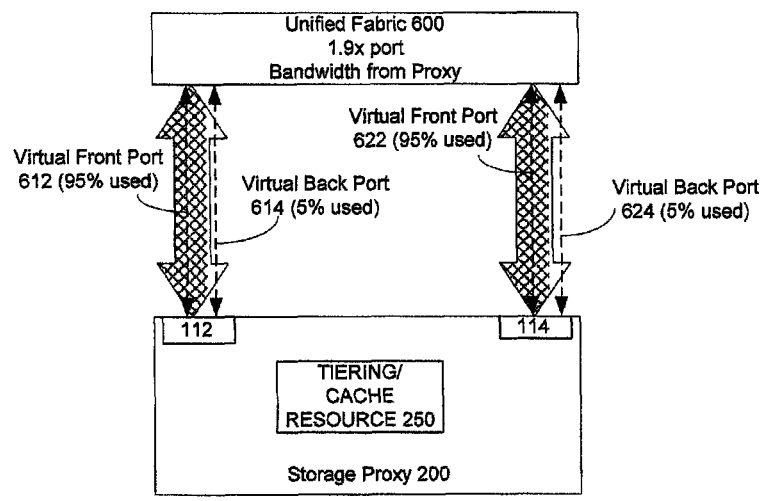

FIG. 12 shows how the second physical port 114 is used to provide additional bandwidth to front zone 602. Assume again that the current data traffic between the initiators 100 and storage proxy 200 exceeds the maximum bandwidth available over physical port 112. Also assume that there is relatively little or no data traffic over the back zone 604 between the storage proxy 200 and initiators 300 (A loading of 5% is shown in FIG. 12 as an example). As mentioned above, this asymmetric front zone loaded bandwidth utilization may happen when the initiator 100 sends a storage access request 120 (FIG. 2) that can be serviced by the tiering or cache resource 250 in storage proxy 200.

Substantially all of the bandwidth available on physical port 112 is used by virtual front port 612 for transferring data from the storage proxy 200 to initiators 100. The virtual back port 614 configured in physical port 112 uses a relatively small amount of bandwidth since there are little or no data being transferred over back zone 604.

Virtual front port 622 on physical port 114 is also configured into front zone 602. Since there is currently little data being transferred over the back zone 604 of the storage fabric 600, the virtual back port 624 also only uses a relatively small amount of the available bandwidth on physical port 114. Thus, substantially all of the bandwidth available on physical port 114 can also be used for transferring data from the storage proxy 200 and initiators 100 through front zone 602.

The virtual port configuration described above increases the amount of available bandwidth for either the front zone 602 or the back zone 604 for asymmetrical data transfers between the initiators 100, targets 300 and storage proxy 200.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A storage proxy, comprising:
a first physical port configured to connect to a storage fabric, the first physical port configured as a first virtual front port to operate in a front zone of the storage fabric, and the first physical port further configured as a first virtual back port to operate in a back zone of the storage fabric;
a second physical port configured to connect to the storage fabric, the second physical port configured as a second virtual front port to operate in the front zone of the storage fabric, and the second physical port further configured as a second virtual back port to operate in the back zone of the storage fabric, wherein the first virtual front port and the second virtual front port are configured to communicate with initiators through the front zone of the storage fabric and the first virtual back port and the second virtual back port are configured to communicate with a storage array through the back zone of the storage fabric; and
processor configured to increase bandwidth utilization through the first virtual front port and the second virtual front port when storage access requests directed from the initiators to the storage array identify data stored in a tiering resource.

2. The storage proxy according to claim 1 wherein the tiering resource is configured to store blocks of data from the storage array.

3. The storage proxy according to claim 1 wherein the processor is configured to:
transfer the data from the storage array into the tiering resource based on a history of the storage access requests between the initiators and the storage array; and
service the storage access requests from the initiators with the data in the tiering resource when the date responsive to the storage access requests is located in the tiering resource.

4. The storage proxy according to claim 3, wherein the processor is further configured to reduce bandwidth utilization through the first virtual front port and the second virtual front port and increase bandwidth utilization through the first virtual back port and the second virtual back port when the data responsive to the storage access requests is not located in the tiering resource.

5. The storage proxy according to claim 3 wherein the processor is further configured to prefetch the data from the storage array into the tiering resource based on the history of the storage access requests and increase bandwidth utilization through the first virtual back port and the second virtual back port while prefetching the data from the storage array into the tiering resource.

6. The storage proxy of claim 1 wherein the storage fabric is a fibre channel network and the physical ports are located in Host Bus Adapter (HBA) cards.

7. The storage proxy according to claim 1 wherein the storage fabric contains a configuration table that maps the first virtual front port and the second virtual front port to the front zone and maps the first virtual back port and the second virtual back port to the back zone.

8. A method, comprising:
configuring a network with a front zone configured to connect a proxy with an initiator;
configuring the network with a back zone configured to connect the proxy with a storage target;
configuring the front zone of the network to include a physical port of the initiator and a first virtual front port for a first physical port of the proxy;
configuring the back zone of the network to include a physical port of the storage target and a first virtual back port for the same first physical port of the proxy;
storing data from the storage targets in a local storage resource;
detecting storage access requests from the initiator to the storage target; and
varying bandwidth utilization in the first virtual front port and the first virtual back port based on the data responsive to the storage access requests being located in the local storage resource.

9. The method of claim 8 further comprising:
configuring the front zone of the network to include a second virtual front port for a second physical port of the proxy;
configuring the back zone of the network to include a second virtual back port for the second physical port of the proxy; and
varying bandwidth utilization between the first and second virtual front ports and the first and second virtual back ports based on the data responsive to the storage access requests being located in the local storage resource.

10. The method of claim 9 further comprising:
increasing bandwidth usage over the first virtual front port and the second virtual front port for asymmetric data transfers between the initiator and the proxy; and
increasing bandwidth usage over the first virtual back port and the second virtual back port for asymmetric data transfers between the storage target and the proxy.

11. The method of claim 10 further comprising:
transferring bandwidth from the first and second virtual back ports to the first and second virtual front ports for the asymmetric data transfers between the initiator and the proxy;
transferring bandwidth from the first and second virtual front ports to the first and second virtual back ports for the asymmetric data transfers between the storage target and the proxy; and
distributing bandwidth substantially evenly between the first and second virtual front ports and the first and second virtual back ports when there are substantially symmetric data transfers between the initiator and the proxy and between the storage target and the proxy.

12. The method of claim 9 further comprising:
temporarily storing data from the storage target in the local storage resource;
receiving the storage access requests from the initiator; and
increasing the bandwidth usage in the first and second virtual front ports and reducing bandwidth usage in the first and second virtual back ports when the data responsive to the storage access request is located in the local storage resource.

13. The method of claim 8 wherein the network is a fibre channel network and the physical ports are Host Bus Adapter (HBA) cards.

14. The method of claim 9 further comprising:
configuring a table to map an address or identifier for the first virtual front port and an address or identifier of the second virtual front port to a same zone identifier for the front zone; and
configuring the table to map an address or identifier for the first virtual back port and an address or identifier for the second virtual back port to a same back zone identifier for the back zone.

15. An apparatus, comprising:
a fibre channel network configured into different zones, wherein a first zone of the fibre channel network is configured with an initiator port for an initiator, a first virtual front port for a first physical port on a storage proxy, and a second virtual front port for a second physical port on the storage proxy; and
wherein a second zone of the fibre channel network is configured with a target port on a storage device, a first virtual back port for the first physical port on the storage proxy, and a second virtual back port for the second physical port on the storage proxy, wherein the storage proxy is configured to:
store copies of data located in the storage device in a tiering media;
monitor storage access requests between the initiator and the storage device;
provide the copies of the data from the tiering media to the initiator responsive to the storage access requests; and
vary bandwidth utilization between the first and second virtual front ports and the first and second virtual back ports based on the copies of the data from the tiering media being provided to the initiator responsive to the storage access requests.

16. The apparatus according to claim 15 further comprising:
a table configured to map an address or identifier of the first virtual front port for the first physical port and an address or identifier for the second virtual front port for the second physical port to the first zone, wherein the table is further configured to map an address or identifier of the first virtual back port for the first physical port and an address or identifier of the second virtual back port for the second physical port to the second zone.

17. The apparatus according to claim 15 wherein the first and second virtual front ports in the first zone are prevented from communicating with the first and second virtual back ports in the second zone.

18. The apparatus according to claim 15 wherein the fibre channel network is further configured to:
increase bandwidth in the first zone for asymmetric data transfers in response to most of the data transferred between the initiator and the storage proxy being the copies of the data from the tiering media;
increase bandwidth in the second zone for asymmetric data transfers between the storage device and the tiering media in the storage proxy; and
distribute bandwidth substantially evenly between the first zone and the second zone in response to substantially symmetric data transfers between the initiator, the storage proxy, and the storage device.

* * * * *

UNITED STATES PATENT AND TRADEMARK OFFICE
CERTIFICATE OF CORRECTION

PATENT NO. : 8,442,059 B1
APPLICATION NO. : 12/855651
DATED : May 14, 2013
INVENTOR(S) : Erik de la Iglesia et al.

It is certified that error appears in the above-identified patent and that said Letters Patent is hereby corrected as shown below:

In the Claims

In column 10, claim 1, line 45, before "processor configured to increase" insert --a--.

Signed and Sealed this
First Day of October, 2013

Teresa Stanek Rea
*Deputy Director of the United States Patent and Trademark Office*